US009934142B2

(12) United States Patent
Diep et al.

(10) Patent No.: US 9,934,142 B2
(45) Date of Patent: *Apr. 3, 2018

(54) WEAR LEVELING IN A MEMORY SYSTEM (71) Applicant: Rambus Inc., Sunnyvale, CA (US)

(72) Inventors: Trung Diep, San Jose, CA (US); Eric Linstadt, Palo Alto, CA (US)

(73) Assignee: Rambus, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/207,175

(22) Filed: Jul. 11, 2016

(65) Prior Publication Data

US 2017/0010964 A1 Jan. 12, 2017

Related U.S. Application Data

(63) Continuation of application No. 14/370,013, filed as application No. PCT/US2012/072219 on Dec. 29, 2012, now Pat. No. 9,390,025.

(60) Provisional application No. 61/582,142, filed on Dec. 30, 2011.

(51) Int. Cl.
| | |
|---|---|
| *G06F 12/00* | (2006.01) |
| *G06F 12/02* | (2006.01) |
| *G06F 12/08* | (2016.01) |
| *G06F 12/126* | (2016.01) |
| *G06F 12/0891* | (2016.01) |
| *G06F 12/1009* | (2016.01) |
| *G06F 3/06* | (2006.01) |
| *G06F 13/00* | (2006.01) |
| *G06F 13/28* | (2006.01) |

(52) U.S. Cl.
CPC ........ *G06F 12/0284* (2013.01); *G06F 3/0616* (2013.01); *G06F 3/0647* (2013.01); *G06F 3/0673* (2013.01); *G06F 12/08* (2013.01); *G06F 12/0891* (2013.01); *G06F 12/1009* (2013.01); *G06F 12/126* (2013.01); *G06F 12/0246* (2013.01); *G06F 2212/1036* (2013.01); *G06F 2212/7211* (2013.01)

(58) Field of Classification Search
CPC .... G06F 12/1009; G06F 12/126; G06F 12/08; G06F 2212/7211; G06F 2212/69
See application file for complete search history.

(56) References Cited

U.S. PATENT DOCUMENTS

| | | | |
|---|---|---|---|
| 5,125,086 | A | 6/1992 | Perazzoli, Jr. |
| 7,861,122 | B2 | 12/2010 | Cornwell et al. |
| 8,051,333 | B2 | 11/2011 | Kohiga |
| 2010/0205363 | A1 | 8/2010 | Hwang et al. |
| 2010/0223531 | A1 | 9/2010 | Fukutomi et al. |

OTHER PUBLICATIONS

Dhiman, Gaurav et al., "PDRAM: A Hybrid PRAM and DRAM Main Memory System," Design Automation Conference 2009, Jul. 26-31, 2009, San Francisco, CA, pp. 664-669. 6 pages.
(Continued)

*Primary Examiner* — Mark A Giardino, Jr.
(74) *Attorney, Agent, or Firm* — Lowenstein Sandler LLP (57) ABSTRACT

Embodiments are disclosed for replacing one or more pages of a memory to level wear on the memory. In one embodiment, a system includes a page fault handling function and a memory address mapping function. Upon receipt of a page fault, the page fault handling function maps an evicted virtual memory address to a stressed page and maps a stressed virtual memory address to a free page using the memory address mapping function.

20 Claims, 9 Drawing Sheets

(56) References Cited

OTHER PUBLICATIONS

Ferreira et al. "Increasing PCM Main Memory Lifetime," Design, Automation & Test in Europe Conference & Exhibition (DATE), 2010, Mar. 8-12, 2010, pp. 914-919. 6 pages.

PCT International Preliminary Report on Patentability dated Jul. 10, 2014 (Chapter I) in International Application No. PCT/US12/072219. 6 pages.

PCT International Search Report dated Apr. 22, 2013 in International Application No. PCT/US2012/072219. 7 pages.

Zhang, Wangyuan et al., "Exploring Phase Change Memory and 3D Die-Stacking for Power/Thermal Friendly, Fast and Durable Memory Architectures," 18th International Conference on Parallel Architectures and Compilation Techniques, pp. 101-112, Sep. 12-16, 2009. 12 pages.

BEFORE:

AFTER:

WEAR LEVELING IN A MEMORY SYSTEM

RELATED APPLICATIONS

This application is a continuation of U.S. patent application Ser. No. 14/370,013 filed Jun. 30, 2014, which is a U.S. National Phase filing under 35 U.S.C. 371 of International Application Number PCT/US2012/072219 filed Dec. 29, 2012, published as WO 2013/102163 on Jul. 4, 2013, and which claims the benefit of 61/582,142 filed on Dec. 30, 2011, the disclosures of which are incorporated herein in their entirety by reference.

BACKGROUND

Memory devices used in different computing devices (e.g., computers, smart phones, etc.) include short-latency storage devices (e.g., random access memory (RAM)) and long-latency storage devices (e.g., hard disk drives). Latency relates to the cycle time of a processor accessing the memory device. Short-latency storage devices can be used to store frequently-used software applications or computer programs (such as operating system functions) and their associated temporary data structures. Further, short-latency storage devices can include memory blocks or pages implemented by an electronic or semiconductor device. However, if an operating system task, software application, or specific computer program is used more frequently than others, the associated memory pages are subjected to significantly more write operations than other memory pages. In other words, the lifetime of an electronic or semiconductor device (and its associated memory pages) may be limited by the number of write or erase cycles (e.g., data storage actions) operated on it.

DETAILED DESCRIPTION

The present disclosure describes devices, systems, and methods that implement different wear leveling techniques to prolong the lifetime of a memory device. The embodiments disclosed may work in conjunction with a virtual memory management system and a memory page replacement function. Embodiments replace one or more pages of a memory to level wear on the memory include an operating system having a page fault handling function and a memory address mapping function. In one embodiment, upon receipt of a page fault, the page fault handling function evicts a page from memory and migrates dirty data stored in the evicted page to a storage device and maps an unmapped virtual memory address to a final stressed page. The page fault handling function also maps a virtual memory address corresponding to a stressed page to a first free page using the memory address mapping function and migrates the data from the stressed page to the first free page. In one embodiment, the final stressed page is determined based on a durability parameter.

Figure 1:
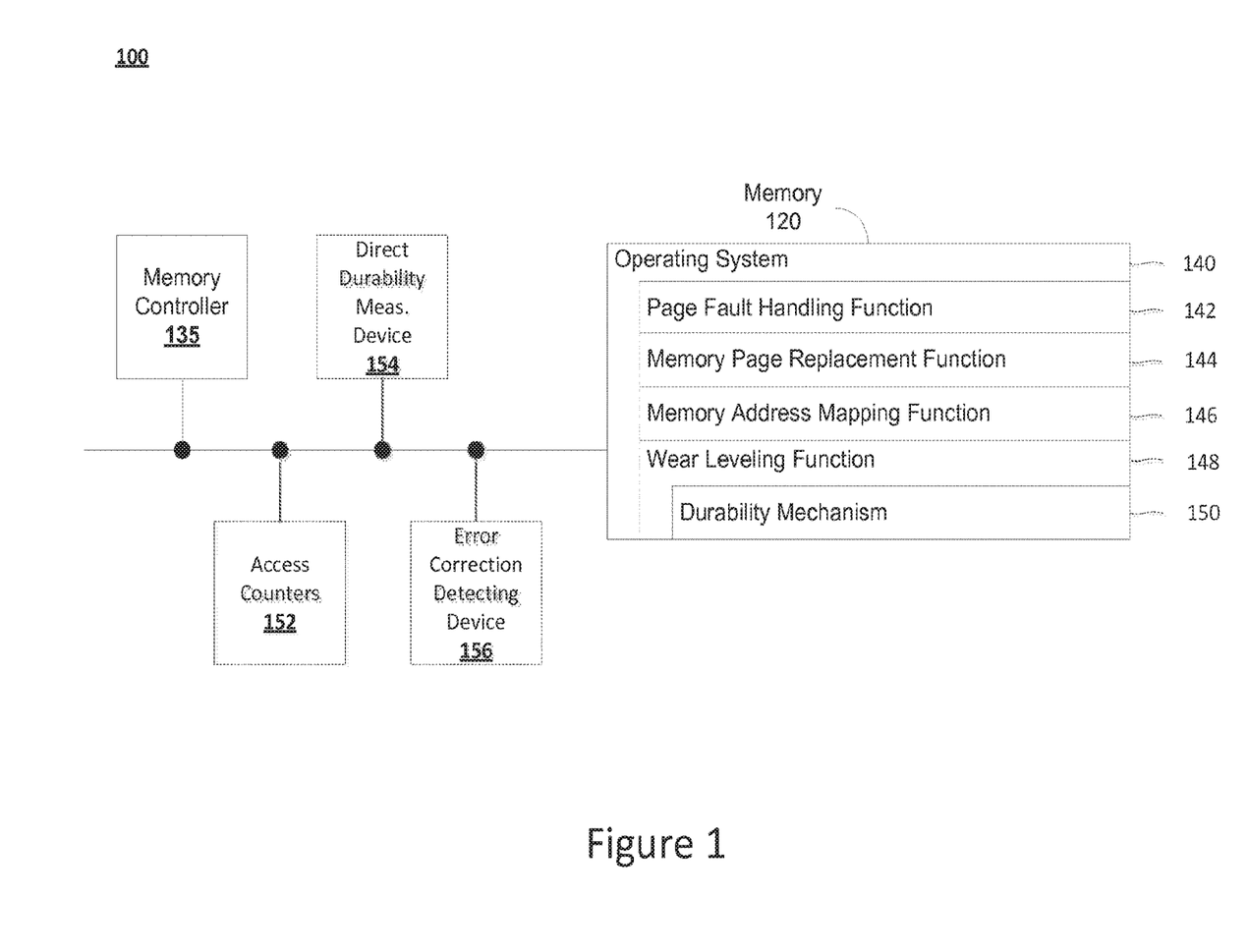
FIG. 1 is a functional block diagram illustrating an example of wear leveling of a memory device.

FIG. 1 is a functional block diagram illustrating an example system 100 for wear leveling of a memory device within a computing device, according to one embodiment. The functional block diagram includes a memory controller 135 and a memory 120. The memory 120 can be one of different types of short-latency storage devices such as DRAM, SRAM, DDR RAM. MRAM or other random access solid state memory devices. Further, the memory 120 has a computer readable storage medium that stores an operating system 140 for the computing device. Functions of the operating system 140 interact with the memory controller 135 that is responsible for handling access to one or more memory devices (e.g., RAM, hard disk drive, etc.) requested by the operating system 140. Further, the memory controller 135 implements other functions such as translating memory addresses from virtual memory addresses to physical memory addresses.

Functions of the operating system include a page fault handling function 142, a memory page replacement function 144, a memory address mapping function 146 and a wear leveling function 148. In one embodiment, the page fault handling function receives a page fault or an interrupt from a virtual memory management unit (VMMU) when the operating system 140 attempts to access a virtual memory address (VMA) that is associated with a physical memory address (PMA) that is not in memory 120 but in a storage memory. The operating system 140 then implements a memory page replacement function 144 to evict a memory page from the memory 120. The memory replacement function 144 includes migrating data stored from the evicted memory page into the storage memory and loading data from the storage memory to the previously evicted page. In one embodiment, data from the evicted memory page is flushed to long-latency storage before being added to a pool of free pages. Depending on the result of a durability comparison, data from the stressed page may be migrated to the first free page, and then the stressed virtual-to-physical address translation can be updated. After this, data from the faulted page can be moved from long latency storage to the final stressed page, followed by updating the virtual-to-physical address translation associated with the faulted page.

The operating system 140 maps the VMA (the accessing of which triggered the page fault) to the PMA of the page in memory 120 where the data was loaded from the storage using the memory addressing mapping function 146. The memory address mapping function 146 uses one or more memory address mapping tables to implement the virtual memory system of the computing device. Further, a wear leveling function 148 is implemented by the operating system 140 in conjunction with the memory page replacement function 144 to level wear across the different memory pages of the memory 120. Wear leveling is performed by associating frequently used computer functions to previously evicted or currently free memory pages that have been subjected to small number of write operations because these memory pages were previously associated with less frequently used computer functions.

Further, the functional block diagram illustrates access counters 152, direct durability measurement device 154, and error correction detecting device 156, each of which interacts with the wear leveling function 148 through a durability mechanism 150 to detect a different type of durability parameter. Access counters 152 track the number of writes to one or more pages of a memory 120 because a memory page can tolerate a finite number of writes during a lifetime. Thus, the number of writes is a type of durability parameter. A direct durability measurement device 154 measures one or more physical characteristics of the semiconductor or electronic device that implements storing of data for a memory page. Such physical characteristics of the semiconductor or electronic device are another type of durability parameter in that the physical characteristics can be processed to determine the wear and the estimated lifetime of a memory page. An error correction detecting device 156 provides the number of error correction operations that are needed for one or more pages of memory. Such an error correction parameter is a measurement of page durability through the evaluation of the cumulative number of errors that have been detected and corrected (with error correcting codes) in the stressed, free, and marked memory pages. The number of errors produced by any of the one or more memory pages is an indication of the wear of a particular memory page. In one embodiment, the error correction detecting device maintains an historic record of correctable ECC errors (e.g., a per-page cumulative occurrence). In one embodiment, the frequency of ECC errors may be presumed to correlate with the cumulative wear that the memory devices have experienced, leading to a durability estimate.

In one embodiment, the access counters 152, the direct durability measurement device 154, and the error correction detecting device 156 forward each of the respective durability parameters to the durability parameter mechanism 150. Alternatively, the memory controller 135 gathers and forwards the different types of durability parameters (e.g., number of writes, direct durability measurement and error correction parameter, etc.) to durability mechanism 150. Alternative embodiments include each of the durability mechanism 150, the memory controller 135, and the wear leveling function 148 using one or more of the types of durability parameters (e.g., number of writes, direct durability measurement and error correction parameter) to indicate the wear or estimate the lifetime of one or more memory pages.

The components and configuration described in FIG. 1 is one example embodiment. Other embodiments with modifications and variations are possible. For example, in one embodiment, access counters 152, direct durability measurement device 154, and error correction detecting device 156 may be integrated into a single durability evaluation unit. In one embodiment, the durability evaluation unit may be a sub-block of memory controller 135. Further, in one embodiment, a separate virtual memory management unit (VMMU) may be a port to a memory arbiter, where the memory arbiter couples to the memory controller 135. One or more processors (not shown) may be used to implement the embodiments of FIG. 1, as well as other embodiments described herein.

Figure 2A:
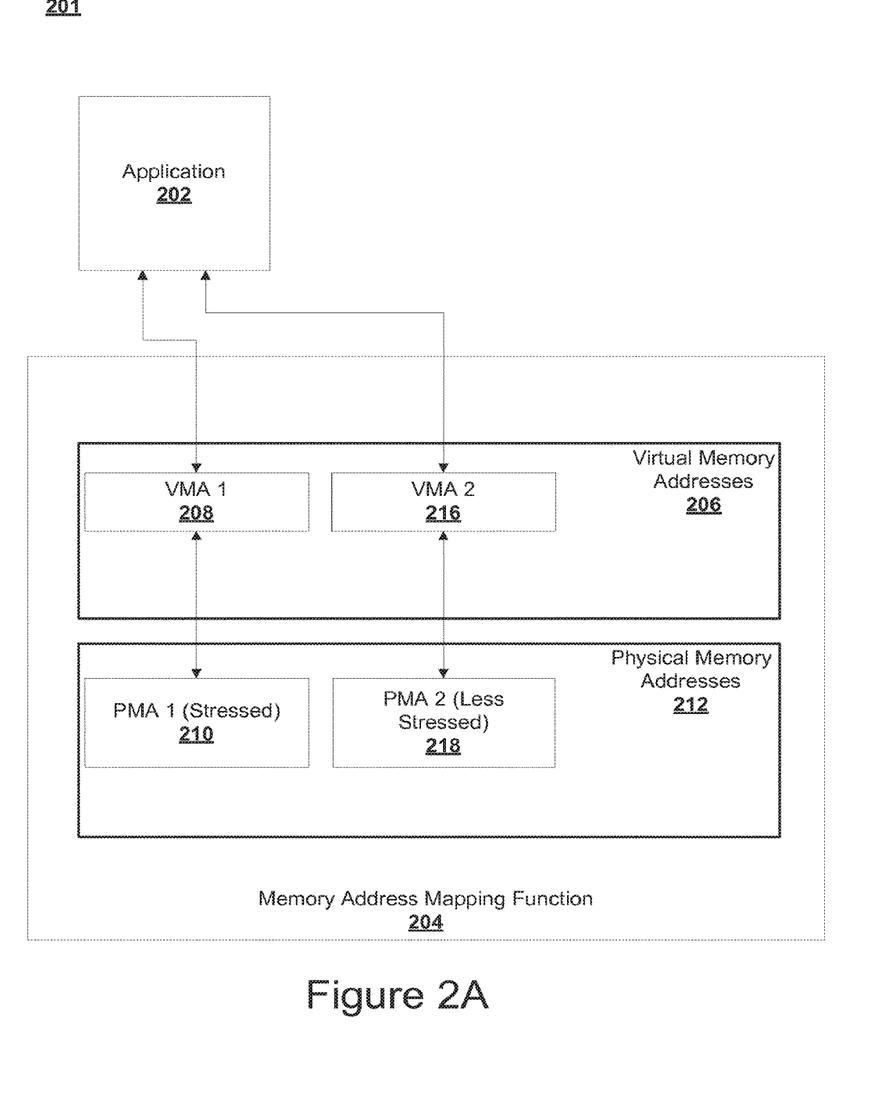
FIGS. 2A-2D are functional block diagrams illustrating example systems for wear leveling of a storage device.

FIG. 2A is a functional block diagram illustrating an example system 200 for wear leveling of a short-latency storage device (e.g., RAM) depicting a software application 202 executed under the control of and with the resources provided by an operating system. FIG. 2A also shows a memory address mapping function 204 which relates or maps virtual memory addresses (VMAs) 206 to physical memory addresses (PMAs) 212 in the short-latency storage device. In addition, a first function of the software application 202 is associated with or corresponds to a VMA 1 (208) and is mapped to a stressed PMA 1 (210). Alternatively, a second function of the software application 202 is associated with or corresponds to a VMA 2 (216) and is mapped to a less stressed PMA 2 (218). In one embodiment, "stress" is a consequence of the frequent usage of a particular VMA, where different usage patterns lead to different levels of stress.

Due to frequent use of the first function, data is written to the memory block or page associated with or corresponding to the stressed PMA 1 (210) with greater frequency than other memory pages, such as those associated with VMA 2 (216) and PMA 2 (218) of the short-latency storage device. A wear leveling function observes and records such a stressed page and its corresponding PMA 1 (210). Further, the wear leveling function is implemented in conjunction with a memory page replacement function as discussed in the present disclosure and illustrated in FIGS. 2B-2D.

Figure 2B:
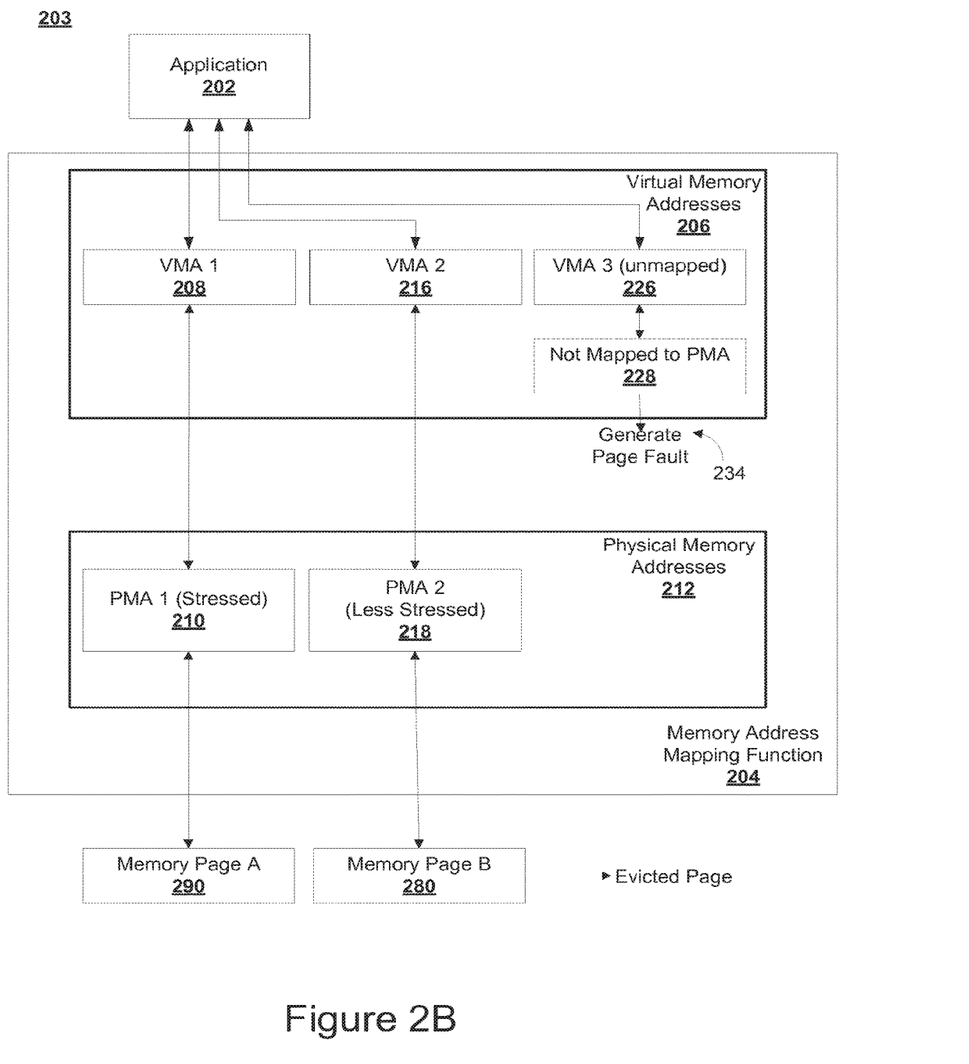

Referring to FIG. 2B, a functional block diagram shows an example system 203 that includes the first function of software application 202 corresponding to VMA 1 (208) that is mapped to a stressed PMA 1 (210) as well as the second function of software application 202 that is shown to correspond to the VMA 2 (216) that is mapped to the corresponding less stressed PMA 2 (218). In another embodiment, the second function of software application 202 corresponds to a VMA that is mapped to a page that has not been recently accessed. In addition, the stressed PMA 1 (210) is associated with or corresponds to a memory page A 290. Further, the less stressed PMA 2 (218) is associated with or corresponds to a memory page B 280. In one embodiment, over most intervals, the least recently used pages correspond to the less stressed pages. There can be some corner cases associated with code storage (that is written infrequently but read often) that weaken the recent use/stress correlation. Application performance may suffer if code is swapped out to long-latency devices. Due to the less frequent use of the second function of software application 202, the number of writes to a memory page B 280 corresponding to the less stressed PMA 218 is less than the number of data writes to the memory page A 290 corresponding to the stressed PMA 210.

Referring again to FIG. 2B, a third function of software application 202 is associated with or corresponds to VMA 3 (226). However, due to infrequent use of the third function of software application 202, VMA 3 (226) is not mapped to a physical memory address associated with a memory page 228. Instead, the data associated with the third function is stored in storage memory (e.g., long-latency storage device such as a hard disk drive). As a result of VMA 3 (226) not being mapped to a PMA, a page fault is generated 234 from a VMMU and received by a page fault handling function of the operating system. Consequently, a memory page replacement function is implemented by the operating system that evicts memory page B 280 from RAM and migrates the data stored on the evicted page to storage memory. In one embodiment, pages are not evicted from memory because they are less stressed. Rather, pages are evicted from memory they are least recently used.

Figure 2C:
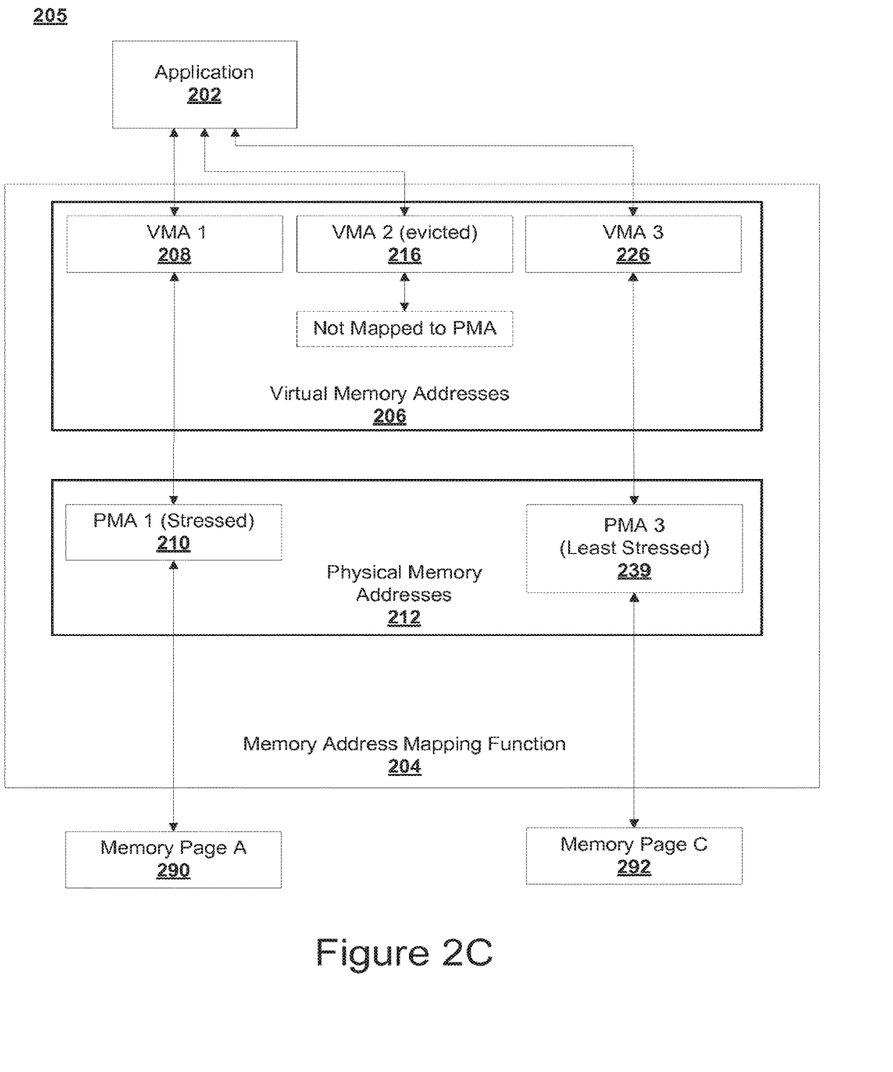

Referring to FIG. 2C, a functional block diagram illustrates an example system 205 that includes a memory page replacement function handling the generated page fault shown in FIG. 2B. Such a memory page replacement function maps VMA 3 (226) to a least stressed PMA 3 (239). Further, a memory page replacement function can have the least stressed PMA 239 be mapped to memory page C 292. Consequently, the memory page B (280) associated with VMA 2 (216) (See FIG. 2B) has been evicted resulting in VMA 2 (216) not being mapped to a PMA.

Figure 2D:
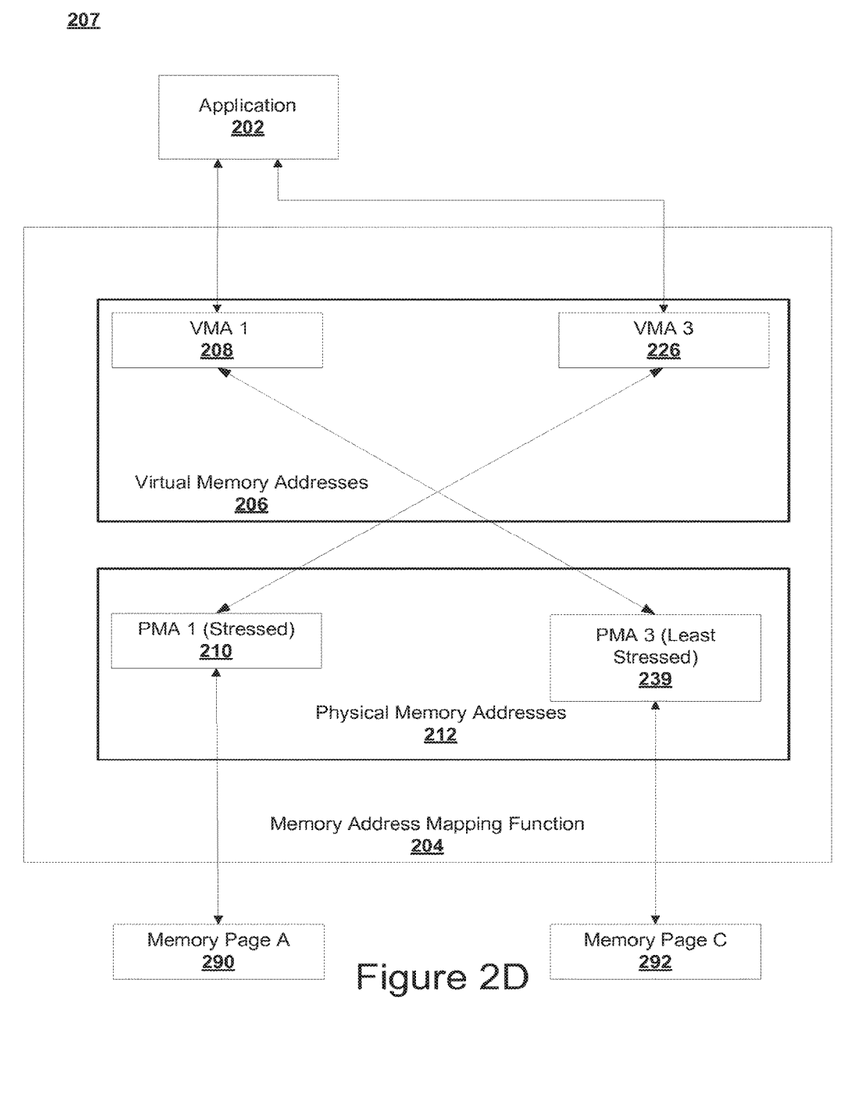

Referring to FIG. 2D, a wear leveling function is used in conjunction with a memory page replacement function to level the wear among different memory pages thereby prolonging memory life by modifying the mapping to the least stressed PMA 239 and/or to memory page C as well as the mapping between stressed PMA 1 (210) and memory page A. In one embodiment, the application 202 determines the least stressed PMA for the mapping. In another embodiment, the application 202 simply determines a PMA with less stress for the mapping.

A functional block diagram of FIG. 2D shows an example system 207 that includes the frequently used first function of software application 202 corresponding to VMA 1 (208). Further, the third function of software application 202 corresponds to VMA 3 (226). However, a wear leveling function works in conjunction with a memory page replacement function such that VMA 3 (226) is mapped to the stressed PMA 1 (210). Alternatively, VMA 1 (208) is mapped to the least stressed PMA 3 (239). As a result, the memory page A 290 previously corresponding to the first function of software application 202 is not subjected to the same frequency of writes as it was when associated with the first function thereby prolonging the lifetime of the memory page. Further, the memory page C 292 (associated with the least stressed PMA 3) is able to tolerate a significant increase in the number of writes associated with the first function without any adverse effect on the memory lifetime because the memory page C 292 had not been previously subjected to a significant number of writes.

Referring to FIGS. 2A-2D, in an example embodiment a software function is the first function of software application 202. A memory page A is associated with the software function and is determined to be stressed by a wear leveling function. Further, the software function is associated with a VMA 1 (e.g., stressed VMA 208) that is mapped to a PMA 1 (e.g., stressed PMA 210) and PMA 1 is associated with the memory page A.

Continuing with the example, memory page A is written about 100,000 times in a time period. Further, a second, less frequently used function can be a disk fragmentation function. A memory page B associated with the disk fragmentation function is written about 1,000 times over the time period. In addition, a least frequently used third function is a particular computer utility function. Any memory page associated with the particular computer utility function is written about 10 times over the time period. Thus, the wear leveling function discussed in describing FIGS. 2A-2D associates the computer utility function to memory page A and the software function to memory page C. Thus, in a next time period, the number of writes to memory page A is significantly less (10 vs. 100,000) than the previous given time period thereby prolonging the life of the memory.

Figure 3:
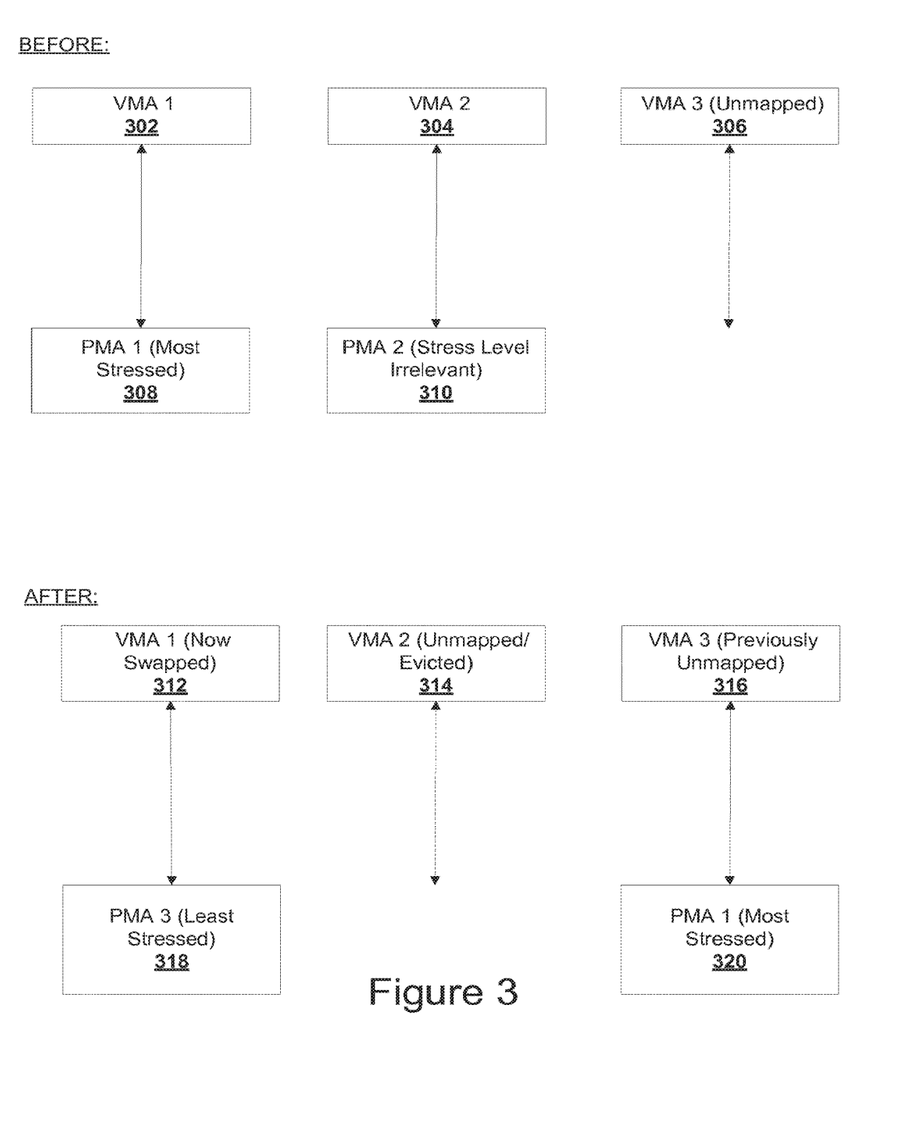
FIG. 3 is a functional block diagram of example wear leveling functions for a memory device.

FIG. 3 is a functional block diagram illustrating an example wear leveling function for a memory device as described in FIGS. 2A-2D. Before implementing the wear leveling function, a VMA 1 (302) corresponds to a PMA 1 (308) that is observed to be most stressed by the wear leveling function and VMA 2 (304) corresponds to PMA 2 (310). In one embodiment, the software application 202 determines the most stressed PMA. In another embodiment, the software application 202 determines a PMA that is more stressed than a predefined threshold. In one embodiment, for wear leveling purposes, the stress level of PMA 2 (310) and corresponding memory page is irrelevant. In addition, VMA 3 (306) is unmapped to a physical memory address. After implementing the wear leveling function, VMA 1 (312) is mapped and swapped to a PMA 3 (318) that is associated with a least stressed memory page. In one embodiment, the least stressed memory page is any page from the free pool that is less stressed (e.g., according to the comparator function). The memory page previously corresponding to VMA 2 (314) has been evicted and is unmapped to a physical memory address. VMA 3 (316) that was previously unmapped corresponds to PMA 1 (320) and is associated with the most stressed memory page. In one embodiment, the most stressed memory page is any page from the marked pool that is more stressed (e.g., according to the comparator function).

Figure 4:
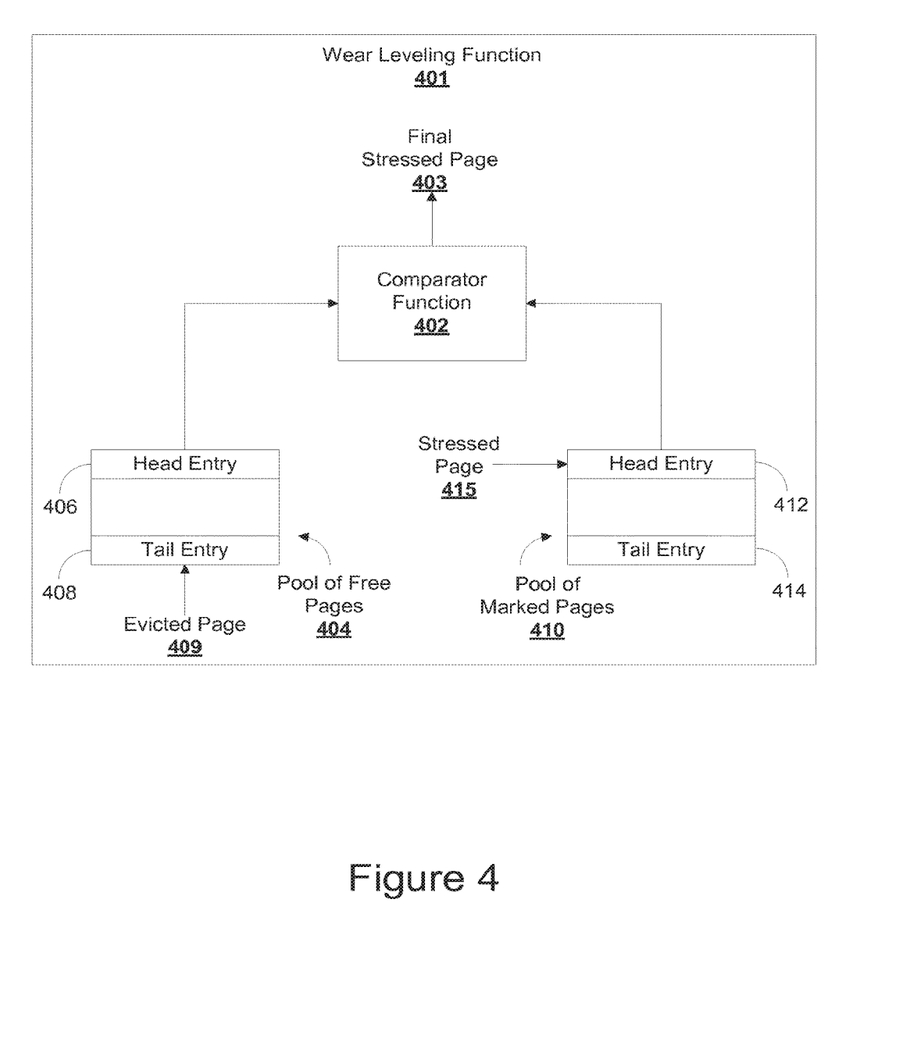
FIG. 4 is a functional block diagram illustrating aspects of an example wear leveling function using a pool of free pages and a pool of marked pages, according to one embodiment.

FIG. 4 is a functional block diagram illustrating aspects of an example system 400 for wear leveling function 401 using a pool of free pages 404 and a pool of marked pages 410, according to one embodiment. Components of the wear leveling function 401 include the pool of free pages 404, the pool of marked pages 410, and a comparator function 402. In one embodiment, each of the pools of free and marked pages 404 and 410 has one or more entries including a head entry (406 and 412) and a tail entry (408 and 414). Each entry in either the pools of free pages or marked pages 404 and 410 is associated with or corresponds to a memory page and a corresponding VMA, PMA, and a durability parameter associated with the memory page. In one embodiment, a durability parameter is a value or indicator of the durability or estimated lifetime of the memory page, such as the number of writes to the memory page, an error correction parameter, or a direct physical durability measurement of the memory page. In one embodiment, the durability parameter is based on one or more operating conditions, such as present operating environmental conditions (recent CPU utilization, temperature, power, etc.). In one embodiment, the durability parameter is determined at any predefined time (e.g., when extra resources are available).

In an embodiment, the pool of free pages 404 may be populated by placing an evicted memory page 409 during a memory page replacement operation at a tail entry 408 of the pool of free pages 404. Further, the pool of marked pages 410 is populated by placing a stressed page 415 during a wear leveling operation (e.g., recording, action, etc.) at a head entry 412 of the pool of marked pages 410. For example, a memory page associated with the stressed PMA in FIGS. 2A-2D is considered the stressed page 415 and placed at the head entry 412 of the pool of marked pages 410. In addition, during the wear leveling operation, a comparator function 402 compares the durability parameter of the head entry 406 of the pool of free pages 404 with the durability parameter of the head entry 412 of the pool of marked pages 410.

In one embodiment, the memory page that is associated with the lowest durability (most stressed) parameter between the two head entries (406 and 412) is designated as a final stressed page 403 by the comparator function 402. In one embodiment, current operating environmental conditions (e.g., recent processor utilization, temperature, power, etc.) change the threshold that is used to determine the final stressed page. In one embodiment, such operating environmental conditions are inputs to comparator function 402. The wear leveling operation can be more expensive in terms of latency, memory bus utilization and power, due to the additional data migration. The PMA of such a final stressed page 403 is mapped to the VMA of a less frequently used software function and subjected to less frequency of writes than when associated with a more frequently used software function. As a result of such a wear leveling function, the lifetime of the memory is lengthened.

Figure 5A:
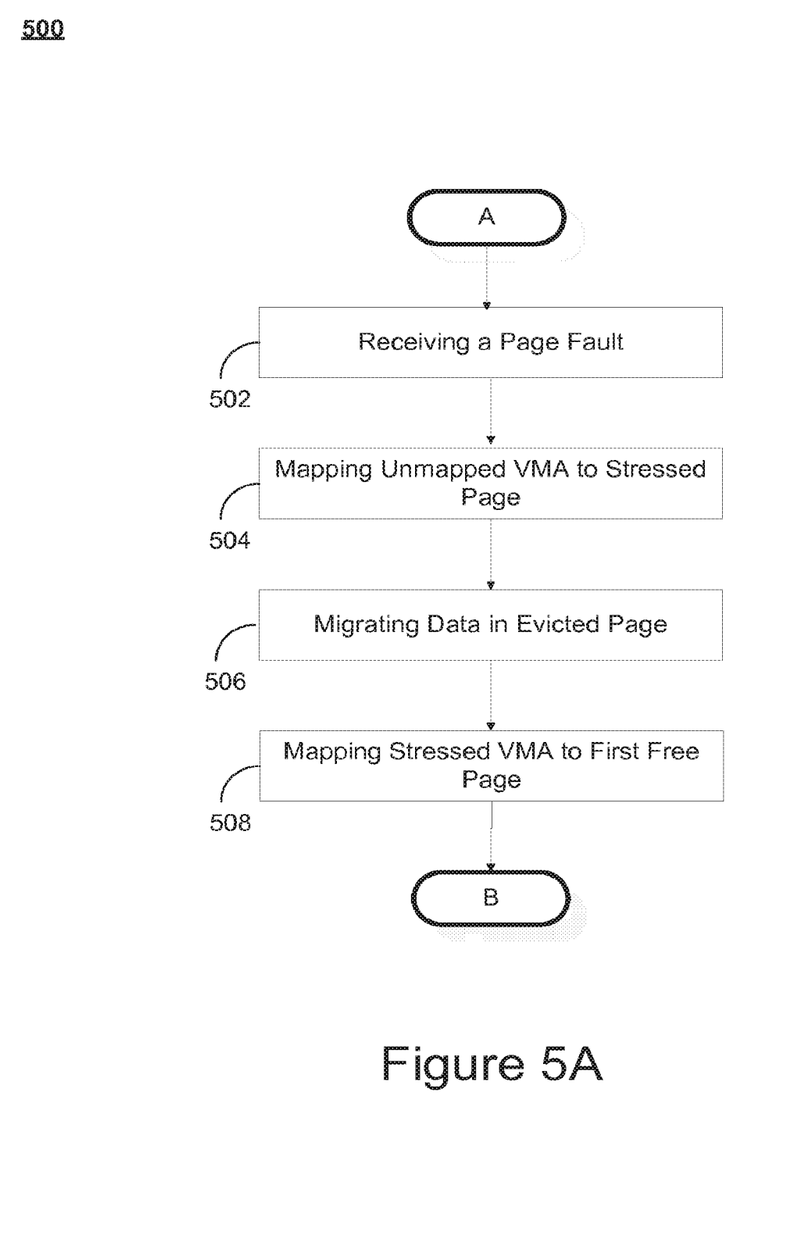
FIGS. 5A and 5B are flowcharts illustrating embodiments of methods for wear leveling of a memory device.
Figure 5B:
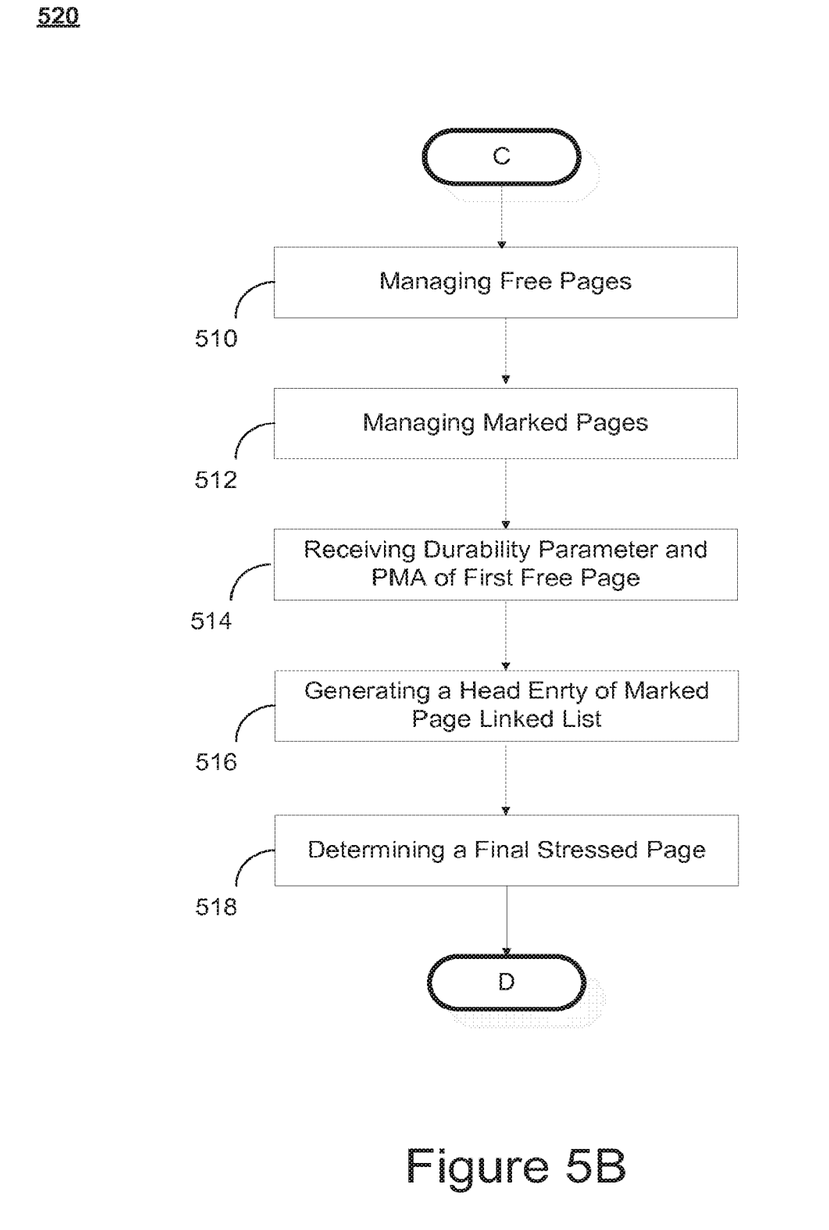

FIGS. 5A and 5B are flowcharts illustrating example methods for wear leveling of a memory device. Referring to FIG. 5A, the flowchart 500 of the example method includes receiving a page fault from a memory controller interface, as shown in block 502. The page fault is triggered by a function of a software application accessing a VMA that is unmapped. Thus, an operating system implements a memory page replacement function upon receiving the page fault. A wear leveling function is implemented in conjunction with the memory page replacement function to level the wear across pages of memory. Such a wear leveling function determines a stressed VMA and its corresponding stressed PMA and stressed memory page. A further step in the method includes mapping a less stressed VMA to a more (final) stressed page using a memory address mapping function, as shown in block 504. The less stressed VMA is associated with a less frequently used function of the software application, compared to a more frequently used function of software application that was previously associated with the more (final) stressed page. The wear leveling function determines the final stressed page based on its respective durability parameter.

In an embodiment, an additional step includes migrating data stored in an evicted page to a storage memory, as shown in block 506. Migrating data from the evicted page in RAM to the storage memory allows data associated with the less frequently used function that triggered the page fault to be loaded into RAM. Another step in the method includes mapping a stressed VMA to a first free page using the memory address mapping function. The stressed VMA is associated with a more frequently used function. The first free page is determined by being associated with a head entry of a pool of free pages. Typically, a memory replacement function loads data associated with less frequently used function that triggered the page fault from storage memory to the first free page. Thereby, mapping the VMA and PMA associated with the less frequently used function to the first free page. Instead, the wear leveling function in one embodiment, as another step in the method, includes mapping a stressed VMA to a first free page using the memory address mapping function based on the durability parameter of the first free page, as shown in block 508, thereby leveling the wear among the different memory pages of the RAM.

Referring to FIG. 5B, the depicted flowchart and example method includes a step for managing one or more free pages, as shown in bock 510. A pool of free pages is used to manage the free pages and each entry in the pool of free pages is associated with a respective free page, a physical address of the free page, and a durability parameter of the free page. The tail entry of the pool of free pages is the most recently evicted page and associated with VMA, PMA, and durability parameter. A further step in the example method includes managing wear leveling of one or more marked pages, as shown in block 512. A pool of marked pages is used to manage the marked pages and each entry in the pool of marked pages is associated with a respective marked page, a physical address of the marked page, and a durability parameter of the marked page. An additional step is receiving a durability parameter of a first stressed page and the stressed virtual memory address corresponding to the first stressed page from a memory controller interface using a wear leveling function, as shown in block 514. Another step includes generating the head entry of the pool of marked pages that is associated with the first stressed page, a physical address of the first stressed page, and the durability parameter of the first stressed page, as shown in block 516. A further step is determining the final stressed page by comparing the durability parameter of the first free page with the durability parameter of the first marked page, as shown in block 518.

In the preceding detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the following description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

Persons of ordinary skill in the art would understand that the examples described in the present disclosure are illustrative and not limiting and that the concepts illustrated in the examples may be applied to other examples and embodiments.

Note that the functional blocks, methods, devices and systems described in the present disclosure may be integrated or divided into different combination of systems, devices, and functional blocks as would be known to those skilled in the art.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least." the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations." without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A device comprising:
   a memory to:
      receive a page fault indicative of an access to a virtual memory address unmapped in the memory; and
      in response to receiving a page fault,
         determine a final stressed page by comparing a first head entry of a pool of free pages with a second head entry of a pool of marked pages to identify a final stressed page; and
         map the unmapped virtual memory address to the final stressed page of the memory.

2. The device of claim 1, the memory further to:
   populate the pool of free pages of the memory with evicted pages; and
   populate the pool of marked pages of the memory with stressed pages.

3. The device of claim 1, wherein to determine the final stressed page, the memory to:
   compare a first durability parameter associated with the first head entry of the pool of free pages with a second durability parameter associated with the second head entry of the pool of marked pages; and
   select the final stressed page based on the comparison of the first durability parameter and the second durability parameter.

4. The device of claim 3, wherein to select the final stressed page based on the comparison of the first durability parameter and the second durability parameter, the memory to:
   determine a more stressed page from the first head entry or the second head entry based on the comparison of the first durability parameter and the second durability parameter, wherein the first durability parameter and the second durability parameter are indicative of a lifetime of an associated memory page; and
   select the more stressed page and the final stressed page.

5. The device of claim 1, wherein the memory, in response to receiving the page fault, further to:

map a stressed virtual memory address to a free page of the pool of free pages.

6. The device of claim 1, wherein the memory, in response to receiving the page fault, further to:
unmap an evicted virtual memory address associated with an evicted page; and
populate a tail entry of the pool of free pages with the evicted page, wherein the tail entry of the pool of free pages is associated with a physical address of the evicted page.

7. The device of claim 1, wherein the memory further to:
translate one or more memory addresses to physical memory addresses.

8. The device of claim 1, wherein the pool of free pages comprises a first plurality of entries, wherein each of the first plurality of entries of the pool of free pages are associated with a free page, a physical address of the free page, and a durability parameter of the free page.

9. The device of claim 1, wherein the pool of marked pages comprises a second plurality of entries, wherein each of the second plurality of entries of the pool of marked pages is associated with a marked page, a physical address of the marked page, and a durability parameter of the marked page.

10. The device of claim 9, wherein the respective durability parameters associated with the free page and the marked page comprise at least one of direct durability measurement, access counters, or error correction parameters.

11. A method comprising:
receiving, by a memory, a page fault indicative of an access to a virtual memory address unmapped in the memory; and
in response to receiving a page fault,
determining a final stressed page by comparing a first head entry of a pool of free pages with a second head entry of a pool of marked pages to identify a final stressed page; and
mapping the unmapped virtual memory address to the final stressed page of the memory.

12. The method of claim 11, further comprising:
populating the pool of free pages of the memory with evicted pages; and
populating the pool of marked pages of the memory with stressed pages.

13. The method of claim 11, wherein determining the final stressed page comprises:
comparing a first durability parameter associated with the first head entry of the pool of free pages with a second durability parameter associated with the second head entry of the pool of marked pages; and
selecting the final stressed page based on the comparison of the first durability parameter and the second durability parameter.

14. The method of claim 13, wherein selecting the final stressed page based on the comparison of the first durability parameter and the second durability parameter further comprises:
determining a more stressed page from the first head entry or the second head entry based on the comparison of the first durability parameter and the second durability parameter, wherein the first durability parameter and the second durability parameter are indicative of a lifetime of an associated memory page; and
selecting the more stressed page and the final stressed page.

15. The method of claim 11, further comprising, in response to receiving the page fault:
mapping a stressed virtual memory address to a free page of the pool of free pages.

16. The method of claim 11, further comprising, in response to receiving the page fault:
unmapping an evicted virtual memory address associated with an evicted page; and
populating a tail entry of the pool of free pages with the evicted page, wherein the tail entry of the pool of free pages is associated with a physical address of the evicted page.

17. The method of claim 11, further comprising:
translate one or more memory addresses to physical memory addresses.

18. The method of claim 11, wherein the pool of free pages comprises a first plurality of entries, wherein each of the first plurality of entries of the pool of free pages are associated with a free page, a physical address of the free page, and a durability parameter of the free page.

19. The method of claim 11, wherein the pool of marked pages comprises a second plurality of entries, wherein each of the second plurality of entries of the pool of marked pages is associated with a marked page, a physical address of the marked page, and a durability parameter of the marked page.

20. The method of claim 19, wherein the respective durability parameters associated with the free page and the marked page comprise at least one of direct durability measurement, access counters, or error correction parameters.

* * * * *